United States Patent [19]

Reimann

[11] 3,898,980

[45] Aug. 12, 1975

[54] OUTDOOR COOKING APPARATUS

[76] Inventor: Paul Eldren Reimann, 1014 E. Center St., Bountiful, Utah 84010

[22] Filed: Oct. 23, 1973

[21] Appl. No.: 408,325

[52] U.S. Cl.................... 126/274; 126/9 R; 126/30
[51] Int. Cl............................ A21b 1/04; A21b 1/52
[58] Field of Search...... 126/29, 30, 274, 9 R, 25 R, 126/337, 332; 99/449

[56] References Cited
UNITED STATES PATENTS

| | | | |
|---|---|---|---|
| 1,309,049 | 7/1919 | Syrett | 99/449 X |
| 2,316,620 | 4/1943 | Rees | 126/337 R |
| 2,421,922 | 6/1947 | Bocchino | 99/449 X |
| 2,757,664 | 8/1956 | McDowell | 126/274 |
| 2,969,055 | 1/1961 | Martin | 126/274 |
| 3,067,737 | 12/1962 | Brown | 126/30 X |

FOREIGN PATENTS OR APPLICATIONS 6,592    4/1891   United Kingdom.................. 99/449

Primary Examiner—William F. O'Dea
Assistant Examiner—Harold Joyce
Attorney, Agent, or Firm—Mallinckrodt & Mallinckrodt

[57] ABSTRACT

A compact, lightweight, collapsible, outdoor cooking apparatus, which can be used as a reflector oven for baking foods by an open fire, hot coals, or other source of heat, and can also be used for grilling, frying and boiling, comprises a partially demountable, open framework adapted to have aluminum foil or the like applied thereto. The framework is made up of an elongate tubular member extending longitudinally and two corresponding sets of three transversely extending radial members adapted for removable attachment, respectively, to opposite ends of the tubular member. The outer members of one set are pivotally interconnected to the corresponding outer members of the other set by means of longitudinal connecting members, and the intermediate members of each set serve as struts with their free ends being pivotally interconnected to the ends of the outer members of the set by elongate connection means. The apparatus is used as a reflector oven by stretching aluminum foil or the like from attachment to one of the longitudinal connecting members, around the elongate tubular member to attachment to the other longitudinal connecting member, thereby providing reflective surfaces that diverge outwardly from the tubular member and, when faced toward a source of heat, concentrate baking or broiling heat in the area between such surfaces. A grill is advantageously provided for suspension between the struts to support food to be baked or broiled. The apparatus may be used as a stove for frying or boiling by stretching aluminum foil or the like directly between the longitudinal connecting members thereby providing a cooking surface for horizontal positioning over a campfire or other heat source.

9 Claims, 7 Drawing Figures

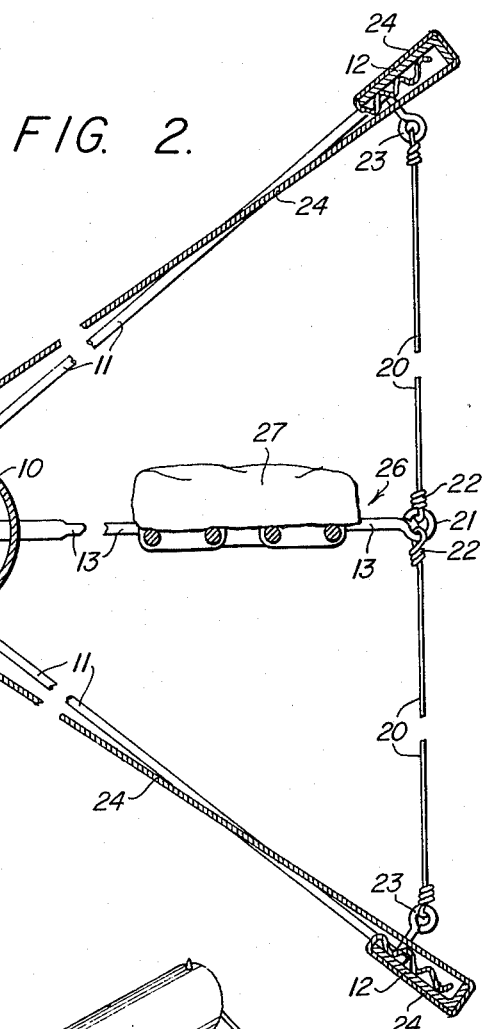
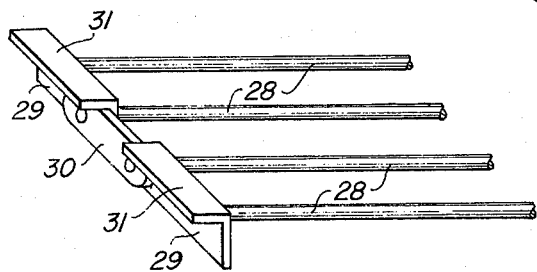
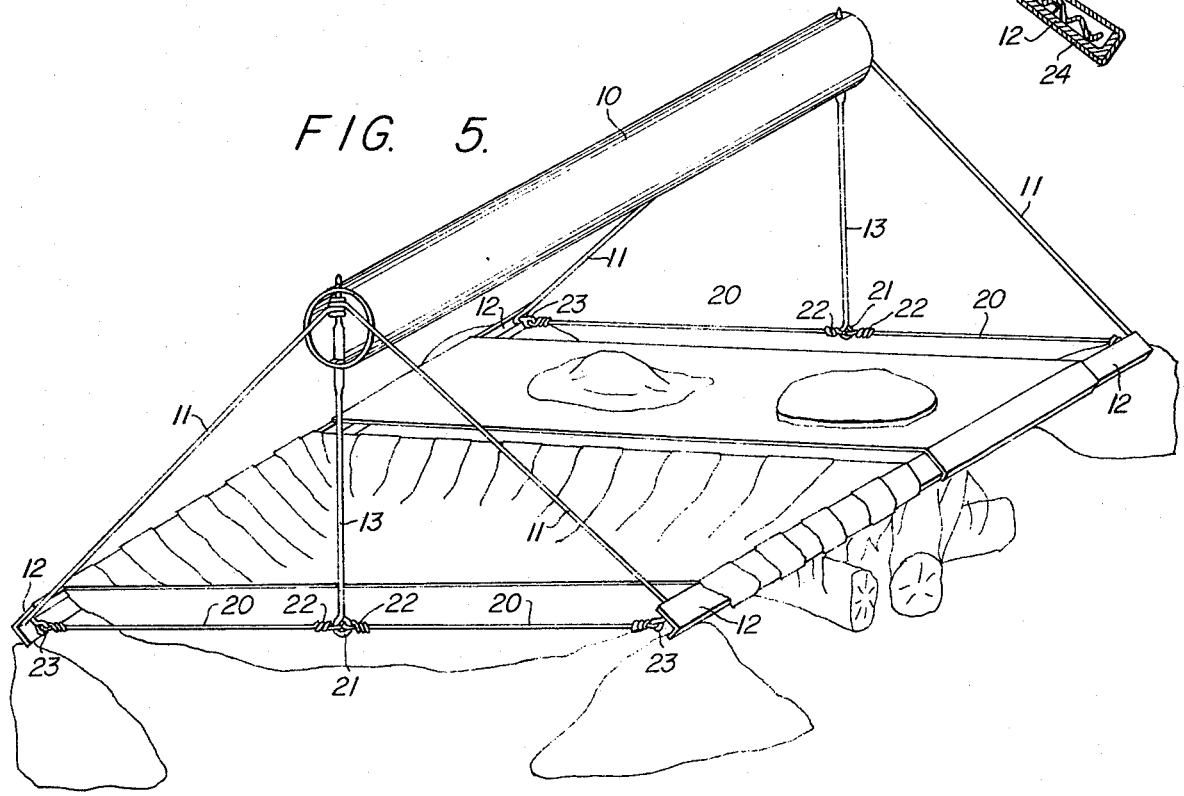

OUTDOOR COOKING APPARATUS

BACKGROUND OF THE INVENTION

1. Field

The invention is in the field of conveniently portable cooking apparatus which can be used to cook foods or boil water outdoors over a campfire or other source of heat.

2. State of the Art

Various types of collapsible reflector ovens are shown in U.S. Pat. Nos. 2,543,115; 2,757,664; 2,921,577; 2,969,055; and 3,026,866. The ovens described in these patents are all constructed from sheet metal pieces, which collapse into a stack of interconnected, superposed sheets for storage or transportation. The flat sheets are bulky and easily damaged when transported from place to place in dufflebags, haversacks and backpacks. Moreover, these ovens cannot be used to fry, grill, or boil. They are useful only as reflector ovens to bake food.

Another type of reflector oven is shown in U.S. Pat. No. 3,067,737 and includes a collapsible framework of elongate elements across which aluminum foil or the like can be stretched. The framework is made up of numerous individual elements, which are separate in the collapsed form. The numerous loose pieces render assembly and dissassembly of the device burdensome, and loose pieces are easily lost during storage or transportation. Again, this device is useful only as a reflector oven for baking purposes.

SUMMARY OF THE INVENTION

In accordance with the present invention, collapsible outdoor cooking apparatus is provided which can be used as a reflector oven for baking food and can also be used for grilling, frying, and boiling food. The apparatus can be folded into a lightweight, compact bundle which is easily carried by a hiker or backpacker to and from the outdoor campsite, and the folded apparatus is capable of withstanding rough treatment, which is to be expected on a camping trip, without incurring any damage.

The apparatus of this invention comprises a partially demountable, open framework adapted to have aluminum foil or the like applied thereto. The framework is made up of an elongate tubular member extending longitudinally and two corresponding sets of three transversely extending radial members adapted for removable attachment, respectively, ot opposite ends of the tubular member. The outer members of one set of radial members are pivotally interconnected to the corresponding outer members of the other set by means of longitudinal connecting members. When attached to the tubular member, the outer members of each set extend divergently from the tubular member, with the longitudinal connecting members being parallel with the tubular member. The intermediate members of the respective sets of radial members are removably attached to the tubular member at opposite ends thereof, so as to extend radially therefrom as struts between the outer members of the respective sets of radial members. The end portion of the intermediate or strut member of each set of radial members is pivotally interconnected to the extending ends of the outer members of that set by elongate connection means.

When the two sets of radial members are dismounted from the tubular member, they remain pivotally interconnected to the longitudinal members and the elongate connection means. These interconnected members can then be folded together into a compact, elongate bundle which, in turn, can be inserted coaxially within the tubular member. Because the dismounted members of the collapsible framework remain interconnected to each other even when folded into the elongate bundle, the risk of losing or misplacing an individual member is eliminated.

The apparatus is used as a reflector oven by stretching a flexible, reflective material, such as aluminum foil, from attachment to one of the longitudinal connecting members, around the elongate tubular member to attachment to the other longitudinal connecting member, thereby providing reflective surfaces that diverge outwardly from the tubular member which, when faced toward a campfire or other source of heat, concentrate baking or broiling heat in the area between such surfaces. A grill or rack is suspended between the strut members to support food to be baked or broiled.

The apparatus is used as a stove for grilling, frying or boiling foods by suspending a grill between the longitudinal rods or by stretching a flexible material between the longitudinal rods as a cooking surface, and then positioning the cooking surface horizontally over a fire or other heat source.

A novel grill unit is also provided which can be used in conjunction with the outdoor cooking apparatus or by itself in cooking food over an open fire, coals or other source of heat. The grill unit comprises a plurality of elongate, parallel elements interconnected at their respective ends by pivoted connecting members which allow the grill to be flexed in one direction but not in the opposite direction. The novel grill retains a rigid flat shape when suspended horizontally between the longitudinal rods of the outdoor cooking apparatus, or the grill can be rolled up to encompass food items, with the rolled-up grill containing such food being suspended over the fire, coals or other heat source.

THE DRAWINGS

Although the embodiment illustrated in the accompanying drawings represents the best mode presently contemplated of carrying out the invention, it is recognized that the inventive concepts herein taught can be utilized in a variety of specific forms within the scope of the claims.

In the drawings:

FIG. 1 is a perspective view of the apparatus of this invention shown being used as a reflective oven with aluminum foil stretched from attachment to one of the longitudinal members, around the tubular member to attachment to the other longitudinal member, and with a grill unit suspended between the center struts upon which food to be baked is supported;

FIG. 2, a vertical section taken along line 2—2 of FIG. 1;

FIG. 3, a fragmentary perspective view, drawn to an enlarged scale, of that portion of the apparatus encompassed by the closed loop 3 of FIG. 1;

FIG. 4, a perspective view of apparatus similar to that shown in FIG. 1, but with the grill unit rolled around pieces of food;

FIG. 5, a perspective view of apparatus of this invention shown being used to fry and boil food over a campfire;

FIG. 6, a perspective view of the collapsible framework in its collapsed and folded form partially inserted coaxially into the tubular member; and FIG. 7, a fragmentary perspective showing one end portion of a preferred grill member according to this invention.

DETAILED DESCRIPTION OF THE ILLUSTRATED EMBODIMENTS

Figure 1:
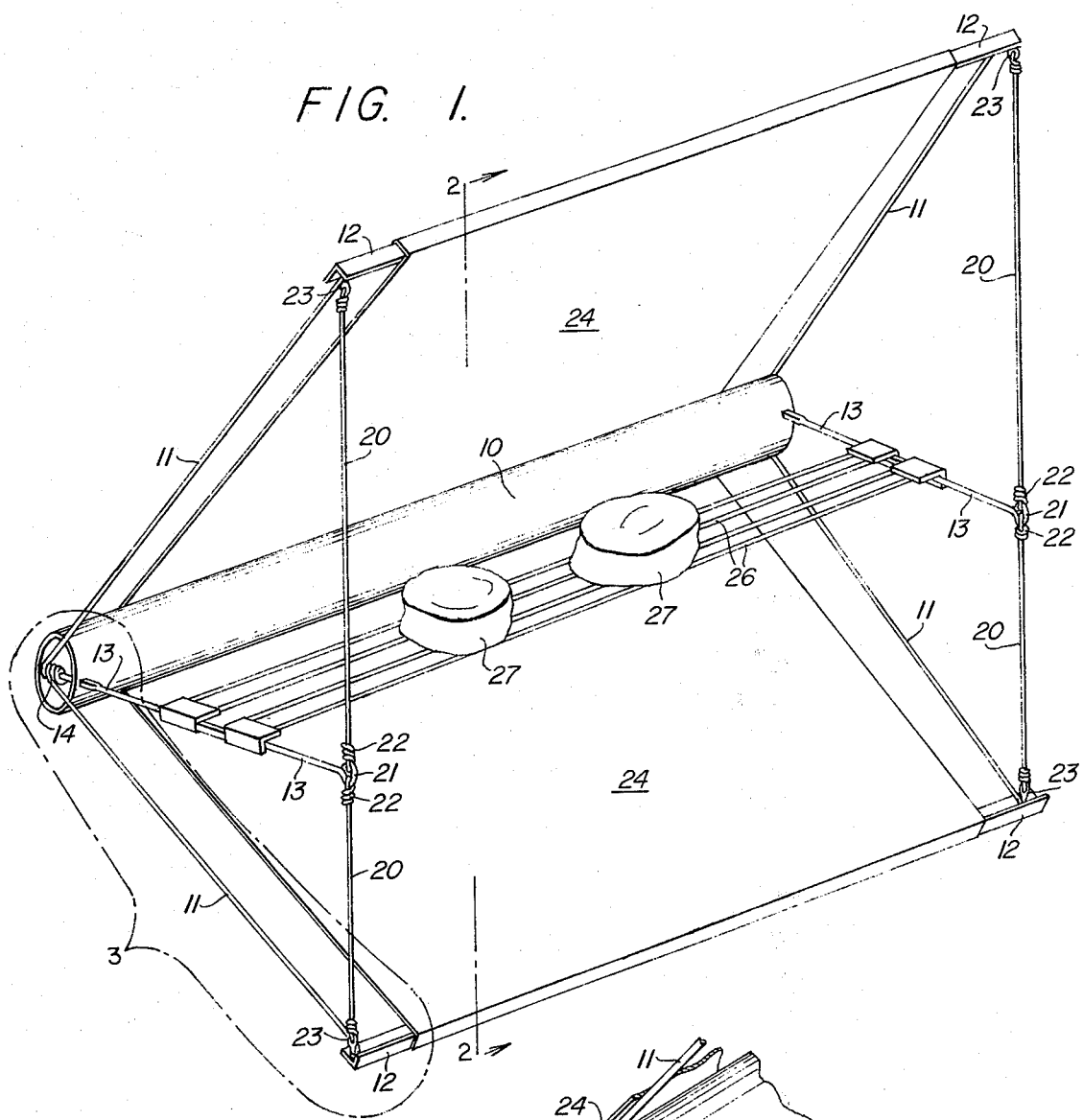

In the form illustrated, the device comprises an elongate tubular member 10 having two end sets of paired radial members 11 which are adapted for removable attachment, respectively, to the tubular member 10 at opposite ends thereof. As attached, the radial members 11 of each end set extend divergently from the tubular member, with corresponding members 11 of the end sets being parallel and having their free ends connected together by longitudinal rods 12. The term rod as used in this specification and appended claims is defined as any elongate structure irrespective of its cross-sectional shape. Rods 12 as shown in the drawings have a cross-sectional shape similar to that of an angle iron and, as will be explained hereinafter, are particularly adapted to hold a sheet of aluminum foil crimped thereon.

Figure 3:
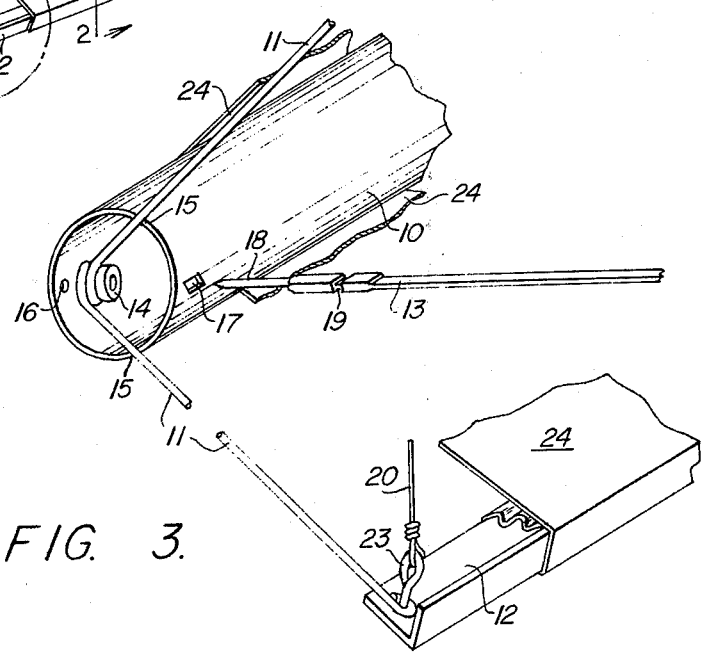

Center strut members 13 are removably attached, respectively, to the tubular member 10 at opposite ends thereof, so that the strut member 13 at each end of the tubular member 10 extends radially therefrom between the radial members 11 of the respective end sets. In the embodiment illustrated, the strut members 13 are also adapted to secure the radial members 11 of the respective end sets in engagement with the tubular member 10. The pairs of radial members 11 at each end of the tubular member are held together by a grommet 14 so that the radial members 11 can pivot about an axis through the eye of the grommet 14. As is best shown in FIG. 3, the tubular member 10 has slots 15 at each end thereof opening longitudinally thereinto through which the radial members 11 extend. The grommets 14 are positioned adjacent the inside wall of the tubular member 10 near the ends thereof. The tubular member 10 has a small hole 16 on each end thereof which is in line with the opening in the grommets 14 when the radial members 11 are correctly positioned in slots 15. The tubular member 10 also has a square hole 17 on each end thereof directly opposite the small holes 16. The strut member 13 has a square cross-sectional shape with the exception of a short end portion 18 thereof which is round in cross-section having a diameter equal to or less than the width of the square portion of strut member 13. The end of strut member 13 is inserted through the square hole 17, and the end portion 18 extends through the hole in grommet 14 and through the small hole 16 in the tubular member so as to pinion the radial members 11 to the end of tubular member 10. The strut member 13 can also have a circumferential groove 19 therein which engages the square hole 17 in tubular per trun 10 when the strut member 13 is correctly positioned. The strut member 13 can then be rotated ⅛ turn to lock itself in engagement with the tubular member 10.

Support members 20 connect the extending end portions of the radial members 11 of each end set to the extending end portion of the center strut member 13 of that set. One end of each support member 20 is pivotally attached to the end of a corresponding strut member 13 with the other end thereof being pivotally attached to a corresponding end of a radial member 11. As illustrated, the end of strut member 13 is bent back upon itself to form a loop 21. The ends of support members 20 are attached to loop 21 by corresponding loops 22 therein which engages with loop 21. The other ends of support members 20 are attached to the ends of radial members 11 and rods 12 for pivotal movement also. The attachment means illustrated for pivotally connecting the ends of support members 20 to radial members 11, and rods 12 include rivet-like members 23 attached to the ends of rods 12 extending therefrom and terminating in a loop through which a corresponding loop in support members 20 is engaged. The end of radial member 11 is formed into a loop which is pivotally attached around the straight portion of rivet member 23.

Figure 6:
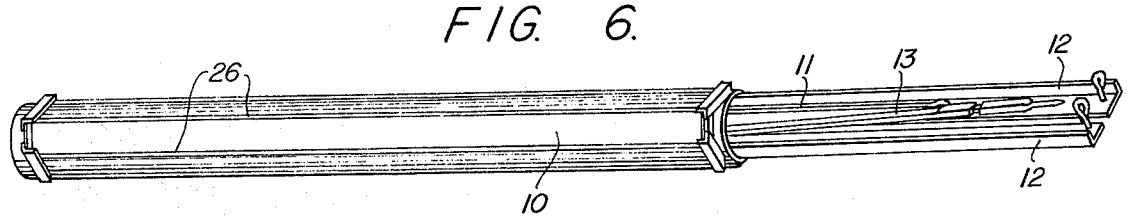

When the members of the apparatus are interconnected together as shown in the illustrated embodiment, the radial members 11, center struts 13, rods 12 and support members 20 all remain interconnected to each other when they are detached from the tubular member 10. These interconnected members can be folded into a compact, elongate bundle 33 which in turn can be inserted coaxially into tubular member 10 as shown in FIG. 6. Because the members remain interconnected to each other, even when folded into the elongate bundle 33, there is no risk of losing or misplacing an individual member thereof.

Figure 4:
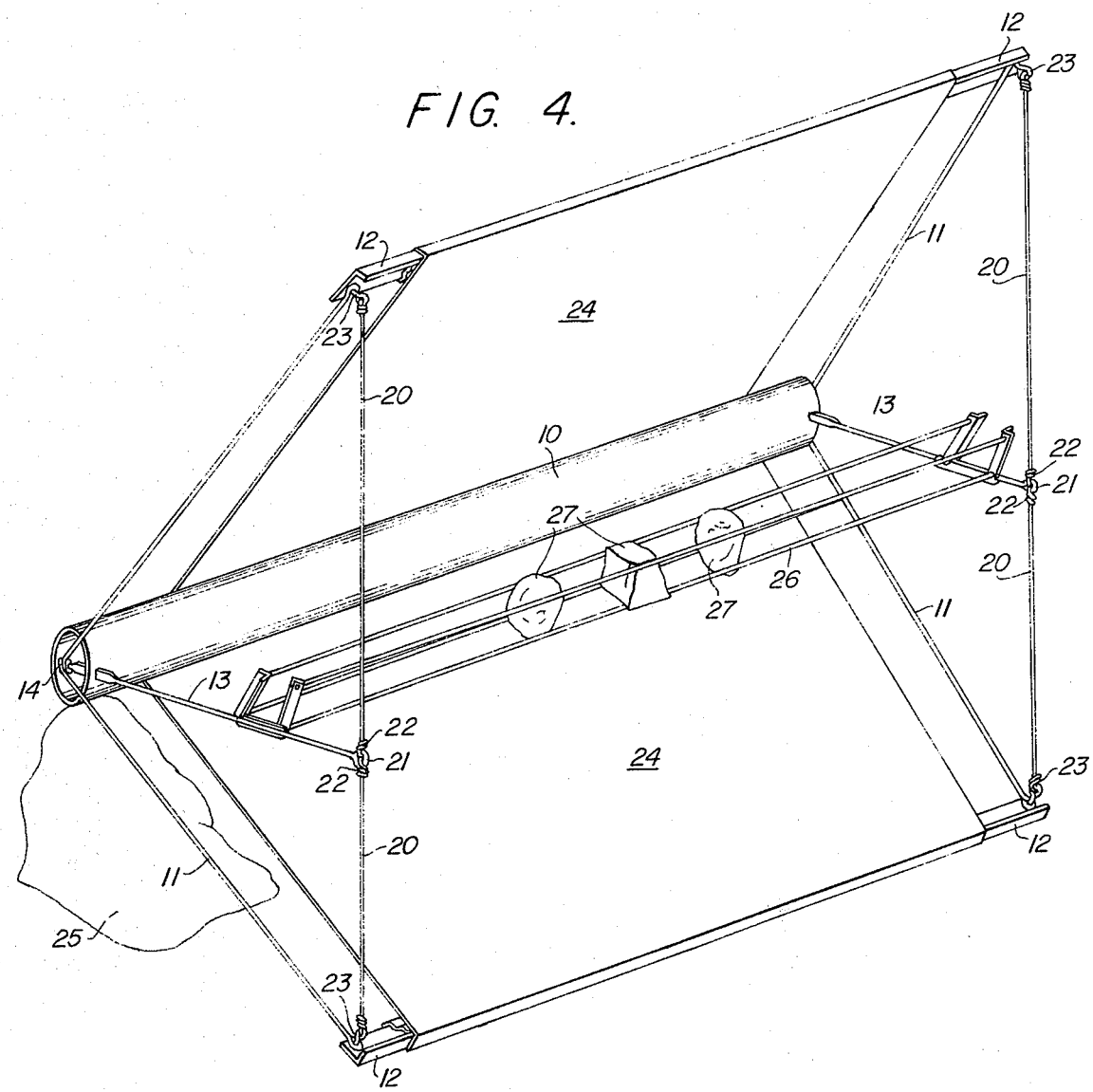

The device is shown in FIGS. 1, 2 and 4 being used as a reflector oven. In such use, aluminum foil 24 is stretched from attachment to one of the elongate rods 12 around the tubular member 10 to the other elongate rod 12 thereby providing divergent, reflective surfaces that may be faced towards a campfire or other source of heat by resting the apparatus on the ground with a rock 25 or similar object supporting the tubular member as shown in FIG. 4. A grill member 26 is suspended between the strut members 13, and food items 27 which are to be cooked are placed on the grill member 26. Leg members could be attached to tubular member 10 to support same when the device is used as a reflector oven; however, the use of a rock or log as illustrated has been found to be completely adequate.

The grill member 26 is adapted so that it can be formed into a flat, rigid grill as shown in FIGS. 1 and 2 or it can be wrapped around food articles as shown in FIG. 4. As shown in FIG. 7, the novel grill member comprises a plurality of elongate, parallel elements 28 connected together at their respective ends by pivoted connecting members 29 and 30. Alternating connecting members 29 have a projection 31 extending from the top edge thereof in a direction away from elements 28. The other connecting members 30 (only one such member is shown in FIG. 7) are pivotally connected to members 29 so that the extensions 31 of members 29 extend over the end portions of members 20. In a preferred mode, the ends of elements 28 are used to pivotally connect the ends of connecting members 29 and 30 together. The novel grill can be flexed in one direction but not beyond a flat, straight arrangement in the complementary direction. Thus, the grill can be suspended as a rigid, flat cooking grill and can also be rolled up for storage purposes or as shown in FIG. 4, to enclose food pieces which otherwise might fall from a flat cooking grill.

As illustrated, the rods 12 have a cross-sectional shape similar to that of an angle iron with one leg thereof somewhat longer than the other. Such a cross-sectional shape aids in holding the stretched aluminum foil 24 tightly in engagement with rods 12. As shown in FIG. 2, the aluminum foil is wrapped around rod 12 and crimped into the area between the foil and the rod 12. Additionally, rod 12 can have notches or other irregularities on the outward edge thereof to further aid in holding the tightly stretched aluminum foil thereto.

In addition to being used as a reflector oven, the apparatus can also be used to fry or grill foods as well as to heat liquids such as soup or water as shown in FIG. 5. To form a surface for frying or grilling food, aluminum foil is stretched tightly from one rod 12 directly to the other rod 12. The apparatus is then supported over a fire or other heat source with the tubular member 10 positioned away from the heat source. In FIG. 5, a hotcake and an egg is shown being cooked on the flat surface formed by the tightly stretched aluminum foil.

As shown in FIG. 5, the aluminum foil can be stretched from one rod 12 to the other rod 12 to form a pouch as well as a flat cooking surface. The pouch is used to hold a liquid such as soup or water. Instead of forming both a cooking surface and a pouch as shown in FIG. 5, aluminum foil could be stretched tightly across the apparatus to form a single surface for grilling and frying food, or one or two pouches could be formed. The grill member 26 can also be suspended between rods 12 instead of the aluminum foil whereby food could be broiled on the grill member directly above the fire or other heat source.

The apparatus of this invention is ideally suited to campfire cooking by backpackers. The apparatus is very light and can be folded into a compact unit to be carried with the rest of the backpackers' gear to and from the campsite. The framework elements can be removed from the elongate tubular member and folded into a compact elongate bundle as explained hereinbefore. The elongate bundle 33 can then be inserted coaxially within the tubular member 10 as shown in FIG. 6. The grill 26 can be wrapped around the tubular member 10 as shown in FIG. 6, and aluminum foil can then be wrapped around the whole unit to hold the grill around the tubular member 10 and to protect the unit from dirt. The folded apparatus is strong and will withstand the very rough handling which is to be expected on a backpacking trip.

What I claim is:

1. Collapsible, outdoor cooking apparatus, which can be used as a reflector oven for baking food and can also be used for grilling, frying and boiling, comprising an elongate, tubular member; two sets of three transversely extending radial members adapted for removable attachment, respectively, to opposite ends of the tubular member with the members of one set of radial members being parallel with the corresponding members of the other set of radial members; longitudinal rods connecting respectively, the free end portions of the outer members of one set of radial members to the outer members of the other set of radial members; and support members which connect the end portions of the outer members of each set of radial members to the end portion of the intermediate member of that set, said apparatus being used as a reflector oven by stretching a flexible, reflective material from one longitudinal rod, around the elongate tubular member, to attachment to the other longitudinal rod thereby providing reflective surfaces that diverge outwardly from the tubular member and, when faced towards a source of heat, concentrate baking or broiling heat in the area between said surfaces, and suspending a grill between the intermediate members to support food to be baked, and said apparatus being used as a stove for grilling, frying or boiling foods by suspending a grill or stretching a flexible material directly between the longitudinal rods as a cooking surface for horizontal positioning over a campfire or other heat source.

2. Collapsible outdoor cooking apparatus as claimed in claim 1, wherein said longitudinal rods are pivotally attached to the radial members, whereby when the radial members are removed from the tubular member, they remain interconnected to the longitudinal rods and support members and can be folded together with the longitudinal rods and support members into a compact, elongate bundle which can be inserted coaxially within the tubular member.

3. Collapsible outdoor cooking apparatus as claimed in claim 2, wherein the end portions of the outer radial members which are to be attached to the respective ends of the tubular member are pivotally attached together by a grommet and the ends of the tubular member have slots opening longitudinally thereinto in which the outer radial members are positioned so that the grommet is adjacent to the inside wall of the tubular member, the tubular member having a small hole on each end thereof, with the small hole being in line with the opening in said grommets, the tubular member also having a square hole on each end thereof directly opposite the small holes, each intermediate radial member having a short end portion of round cross-section with the remainder thereof having a square cross-section slightly smaller than the square holes in the tubular member so that the intermediate radial members can slide through the square holes with the short portion thereof extending through said grommets and through the small hole in the tubular member to pinion the radial members to the tubular member.

4. Collapsible outdoor cooking apparatus as claimed in claim 3 wherein each intermediate radial member has a circumferential groove therein which engages the square hole in the tubular member so that said intermediate radial member can be rotated to lock itself in engagement with the tubular member.

5. A collapsible outdoor cooking apparatus as claimed in claim 2 wherein aluminum foil is stretched from attachment to one of the longitudinal rods around the elongate tubular member to attachment to the other longitudinal rod thereby providing divergent reflective surfaces, and a grill is suspended between the intermediate members for supporting food to be baked.

6. Collapsible outdoor cooking apparatus as claimed in claim 5 wherein the grill comprises a plurality of elongate, parallel elements connected together at their respective ends by pivoted connecting members which allow the grill to be flexed in one direction but not in its complementary direction whereby the grill can be suspended between the intermediate members as a rigid, flat grill and can also be rolled up into a compact roll for storage purposes.

7. Collapsible outdoor cooking apparatus as claimed in claim 2 wherein aluminum foil is stretched directly from attachment to one of the longitudinal rods to attachment to the other longitudinal rod as a cooking surface or positioned horizontally over a fire or other heat source.

8. Collapsible outdoor cooking apparatus as claimed in claim 2 wherein a grill is suspended between the longitudinal rods and positioned horizontally over a fire or other heat source.

9. Collapsible outdoor cooking apparatus as claimed in claim 8 wherein the grill comprises a plurality of elongate, parallel elements connected together at their respective ends by pivoted connecting members which allow the grill to be flexed in one direction but not in its complementary direction, whereby the grill can be suspended between the intermediate members a rigid, flat grill and can also be rolled up into a compact roll for storage purposes.

* * * * *